US011614607B2

(12) United States Patent
Henthorn

(10) Patent No.: US 11,614,607 B2
(45) Date of Patent: Mar. 28, 2023

(54) SIMULTANEOUS SPHERICAL PANORAMA IMAGE AND VIDEO CAPTURING SYSTEM

(71) Applicant: Barry Henthorn, Bothell, WA (US)

(72) Inventor: Barry Henthorn, Bothell, WA (US)

( * ) Notice: Subject to any disclaimer, the term of this patent is extended or adjusted under 35 U.S.C. 154(b) by 165 days.

(21) Appl. No.: 17/008,153

(22) Filed: Aug. 31, 2020

(65) Prior Publication Data
US 2020/0400927 A1 Dec. 24, 2020

Related U.S. Application Data

(63) Continuation of application No. 15/654,613, filed on Jul. 19, 2017, now Pat. No. 10,761,303.

(60) Provisional application No. 62/364,262, filed on Jul. 19, 2016.

(51) Int. Cl.
| | |
|---|---|
| *G02B 13/06* | (2006.01) |
| *G02B 17/00* | (2006.01) |
| *G02B 5/08* | (2006.01) |
| *G06T 3/00* | (2006.01) |

(52) U.S. Cl.
CPC ........... *G02B 13/06* (2013.01); *G02B 5/0816* (2013.01); *G02B 17/00* (2013.01); *G06T 3/0025* (2013.01)

(58) Field of Classification Search
CPC ........ G02B 13/06; G02B 5/08; G02B 5/0816; G02B 17/00; G02B 17/08; G06T 3/00; G06T 3/0025
USPC .......................... 359/834, 725, 726, 728, 729
See application file for complete search history.

(56) References Cited

U.S. PATENT DOCUMENTS

| | | | | | |
|---|---|---|---|---|---|
| 4,146,296 | A | * | 3/1979 | Mandlak | G02B 23/02 359/434 |
| 6,130,783 | A | * | 10/2000 | Yagi | H04N 5/2259 359/627 |
| 6,552,744 | B2 | | 4/2003 | Chen | |
| 7,570,437 | B2 | * | 8/2009 | Gal | G03B 37/06 359/708 |
| 2014/0320592 | A1 | | 10/2014 | Amadio et al. | |
| 2015/0304559 | A1 | * | 10/2015 | Glasse | H04N 5/232 348/38 |

* cited by examiner

*Primary Examiner* — Jade R Chwasz
*Assistant Examiner* — Jyotsna V Dabbi
(74) *Attorney, Agent, or Firm* — Christopher Mayle; Bold IP, PLLC

(57) ABSTRACT

An omnidirectional image and video capturing system including a tube, a plurality of reflectors, openings for rays of light to the enter tube, and a stitching, display or decoding non-transitory storage media. The reflectors may include a first mirror, a second mirror, a third mirror, and a fourth mirror and may be angled at an approximate 45-degree angle and a fifth mirror that may capture reflected images from the first (4) four mirrors.

13 Claims, 8 Drawing Sheets

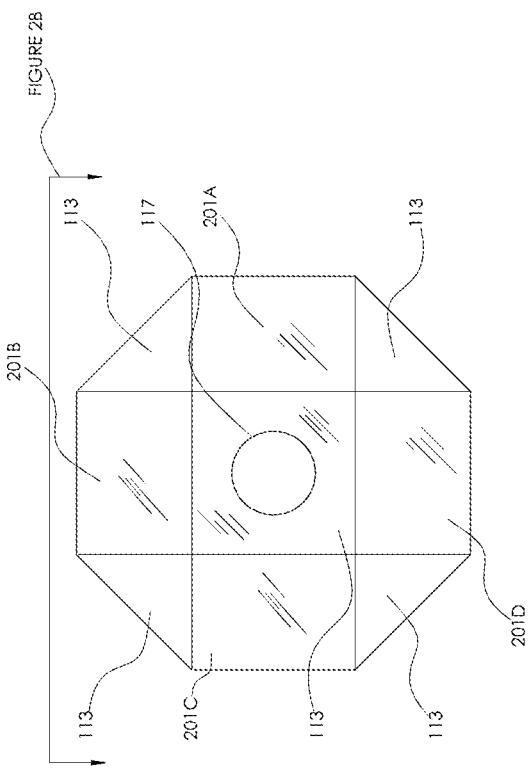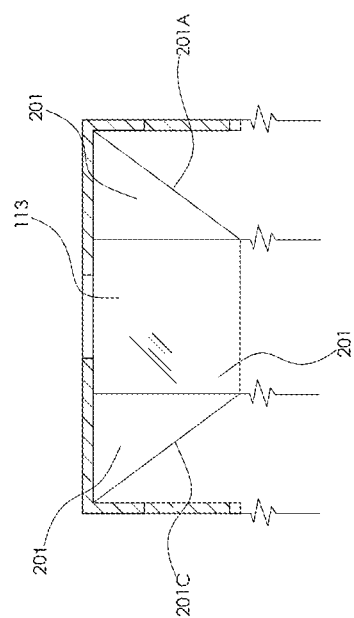

SIMULTANEOUS SPHERICAL PANORAMA IMAGE AND VIDEO CAPTURING SYSTEM

CROSS-REFERENCE TO RELATED APPLICATIONS

The present application is a continuation which claims priority to U.S. Non-Provisional patent application Ser. No. 15/654,613 filed on Jul. 19, 2017, which claims the benefit of U.S. Provisional Patent Application No. 62/364,262 filed on Jul. 19, 2016, entitled "SIMULTANEOUS SPHERICAL PANORAMA IMAGE AND VIDEO CAPTURING SYSTEM;" which is incorporated herein by reference in its entirety as if fully set forth herein.

TECHNICAL FIELD

The field of invention generally relates to an omnidirectional image and video capturing system. More specifically, the field of invention generally relates to an omnidirectional image and video capturing system having a single lens, no lenses, or a plurality of openings or lenses. The device directs light from a sphere surrounding the device to a single reflector that is then transformed into a full 360×360 spherical image or any subset thereof.

BACKGROUND

Image and video capturing systems are important devices. Traditionally, image and video capturing systems allow users to view and record only things that are directly in front of the device. To see in a 360-degree circle, traditional image and video capturing systems must rotate. It is also convenient that such a 360-degree image and video capturing system be utilized with or without any single or multiple lenses.

Panoramic and virtual reality systems are rapidly developing and becoming more and more important. Virtual Reality vacations where two or more people put themselves virtually in a tourist destination either using a prerecorded or live picture are becoming more popular. Viewing of a live sporting event using virtual reality is also a growing market. News stations may also begin to want to put viewers directly at the location of a news story using virtual reality.

Current panoramic systems, such as the one described in U.S. Pat. No. 6,552,744 B2, require the user to take multiple photographs from multiple locations. Each of these separate photographs is then combined to form one panoramic photograph. Alternatively, as in US 20140320592 A1, multiple cameras are used to obtain a similar effect.

Security systems can also benefit from true 360×360 degree viewing. Drones, or security cameras with true instantaneous full 360×360 degree viewing would drastically increase security possibilities.

What is needed is an image and video capturing system that may be utilized with zero, one, or a plurality of lenses and can take panoramic or virtual reality pictures and/or full motion video without requiring the use of multiple cameras, rotation, or multiple views from one camera. What is needed is an image and video aggregator that is capable of simultaneously recording in a sphere surrounding the device.

SUMMARY

The field of invention generally relates to an omnidirectional image and video capturing system. More specifically, the field of invention generally relates to a 360-degree image and capturing system having no lenses, a single lens, or a plurality of lenses. The device directs light from a sphere surrounding the device to a single reflected aggregate image that is then transformed into a full 360×360 spherical image or any subset thereof.

It is an object of the present invention to provide a video and image capturing system comprising a tube with a top surface, an exterior surface, and an interior surface, at least one primary reflector positioned on the interior surface of the tube, at least one secondary reflector positioned within the interior surface of the tube to reflect an image from at least one primary reflector on the interior surface of the tube, a plurality of first holes through the tube, reflective portions of the primary reflectors directed to the plurality of holes wherein rays of light enter through the plurality of first holes and reflect off the at least one primary reflector on the interior surface of the tube, a second hole through the top of the tube, the reflective portion of the secondary reflector directed to the second hole wherein rays of light enter through the second hole and reflect off the secondary reflector, a third hole through the tube, the third hole, the reflective portion of the secondary reflector directed to the third hole, wherein the secondary reflector reflects an image that passes through the third hole, wherein the at least primary reflector is isohedral in shape, wherein the tube is in a shape of an octagonal cylinder, wherein at least one optical lens is mounted coaxially within the tube, arranged substantially at a right-angle to the tube, wherein the system combines images from all viewing angles into one image, wherein the image is decoded utilizing one of stitching, display or decoding non-transitory storage media.

It is an object of the present invention to provide a video and image capturing system comprising a tube with a top surface, an exterior surface, and an interior surface, four primary reflectors, wherein the primary reflectors reflect images collected from rays of light from a plurality of open cavities through the tube, a first open cavity positioned through the top surface of the tube, at least one secondary reflector, the secondary reflector a mirror, the secondary reflector positioned between the primary reflectors and a bottom surface of the tube to reflect an image reflected from the primary reflectors on the interior surface of the tube and to receive rays of light from the open cavity positioned through the top surface, a second open cavity positioned through the tube to receive the reflected image from the secondary reflector wherein the reflected image at the second open cavity is configured to be captured, wherein the primary reflectors positioned on the interior surface of the tube are aligned at an acute angle from the central axis of the tube, directed towards four openings, the four primary reflectors and the respective four openings symmetrical around the central axis, the secondary reflector directed towards the primary reflectors at an acute angle, wherein the primary reflectors on the interior surface of the tube are isohedral in shape, wherein there is a plurality of holes through the tube wherein rays of light enter through the plurality of holes and reflect off the primary reflectors on the interior surface of the tube, wherein the tube is of polygonal square shape, wherein at least one optical lens is mounted coaxially within the tube, arranged substantially at a right-angle to the tube, wherein the system combines images from all viewing angles into one image, wherein the image is configured to be decoded utilizing one of stitching, display or decoding non-transitory storage media.

It is an object of the present invention to provide a video and image capturing system comprising a first and second tube each with a top surface, bottom surface, an exterior surface, and an interior surface, the first tube and the second tube each having four-primary reflectors positioned on the interior surface of the first tube and the second tube wherein the primary reflectors reflect images collected from rays of light from a plurality of open cavities through the first and second tubes, the first tube and the second tube each having a first open cavity positioned through the top surface of the first and second tubes along a central axis of the first tube and the second tube, the first tube and the second tube each having at least one secondary reflector positioned within the interior of the first and second tubes to reflect an image reflected from the primary reflectors on the interior surface of the first and second tubes and to receive rays of light from the open cavity positioned through the top surface of the first and second tubes, the first tube and the second tube each having a second open cavity positioned through each of the first and second tubes to receive the reflected image from the secondary reflector, wherein the second tube is mounted to the first tube in an opposed configuration such that the tubes are coaxial, wherein the bottom surface of the first tube shares a surface with the top surface of the second tube, wherein the second tube is mounted to the first tube in an opposed configuration such that the tubes are coaxial, wherein the bottom surface of the first tube shares a surface with the top surface of the second tube, wherein an apparatus is mounted to the system wherein the apparatus receives images from the secondary reflector in the first and second tube, wherein at least one lens is mounted coaxially within the first tube and the second tube, wherein the primary reflectors positioned on the interior surface of the first and second tube are aligned at an acute angle away from the central axis of the first tube and the second tube, directed towards at least one opening, the four primary reflectors and respective four openings symmetrical around the central axis of the first tube and the second tube, the secondary reflector directed towards the primary reflectors at an acute angle, wherein there is a plurality of holes through the first and second tube wherein rays of light may enter through the plurality of holes and reflect off the primary reflectors on the interior surface of the first tube and the second tube, wherein the system combine images from all viewing angles into one manually decoded image, wherein the image may be decoded utilizing one of stitching, display or decoding non-transitory storage media.

BRIEF DESCRIPTION OF DRAWINGS

The present invention will be described by way of exemplary embodiments, but not limitations, illustrated in the accompanying drawings in which like references denote similar elements, and in which:

FIG. 2A-D illustrate a cutaway view of the top, side view close to the top, isometric view of the top, and cutaway view, respectively, of the omnidirectional image and video capturing system in FIG. 1.

DETAILED DESCRIPTION

It is to be understood that the disclosure of the invention in this specification includes all possible combinations of such features. For example, where a feature is disclosed in the context of an aspect or embodiment of the invention, or a claim, that feature can also be used—to the extent possible—in combination with and/or in the context of other aspects and embodiments of the invention, and in the invention generally.

The term "comprises" and grammatical equivalents thereof are used herein to mean that other components, ingredients, steps, etc. are optionally present. For example, an article "comprising" (or "which comprises") components A, B, and C can consist of (i.e., contain only) components A, B, and C, or can contain not only components A, B, and C but also contain one or more other components.

The term "at least" followed by a number is used herein to denote the start of a range including that number (which may be a range having an upper limit or no upper limit, depending on the variable being defined). For example, "at least 1" means 1 or more than 1. The term "at most" followed by a number is used herein to denote the end of a range, including that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)–(a second number)," this means a range whose limits include both numbers. For example, "25 to 100" means a range whose lower limit is 25 and upper limit is 100, and includes both 25 and 100.

Definitions

Omnidirectional: Represents a complete spherical field of view. The field of view encompasses both a 360-degree field of view in the plane of the object and in the plane perpendicular to the object. Thus a spherical field of view is created forwards, backwards, right, left, above, and below the object.

Figure 6:
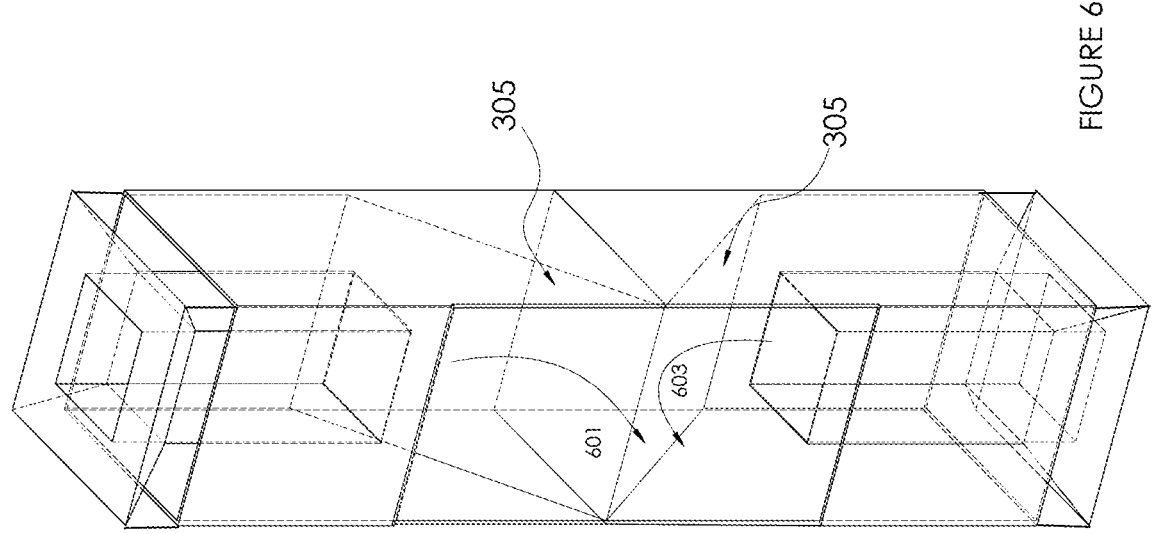
FIG. 6 is an illustration of the interior of the omnidirectional image and video capturing system in FIG. 5.
Figure 7:
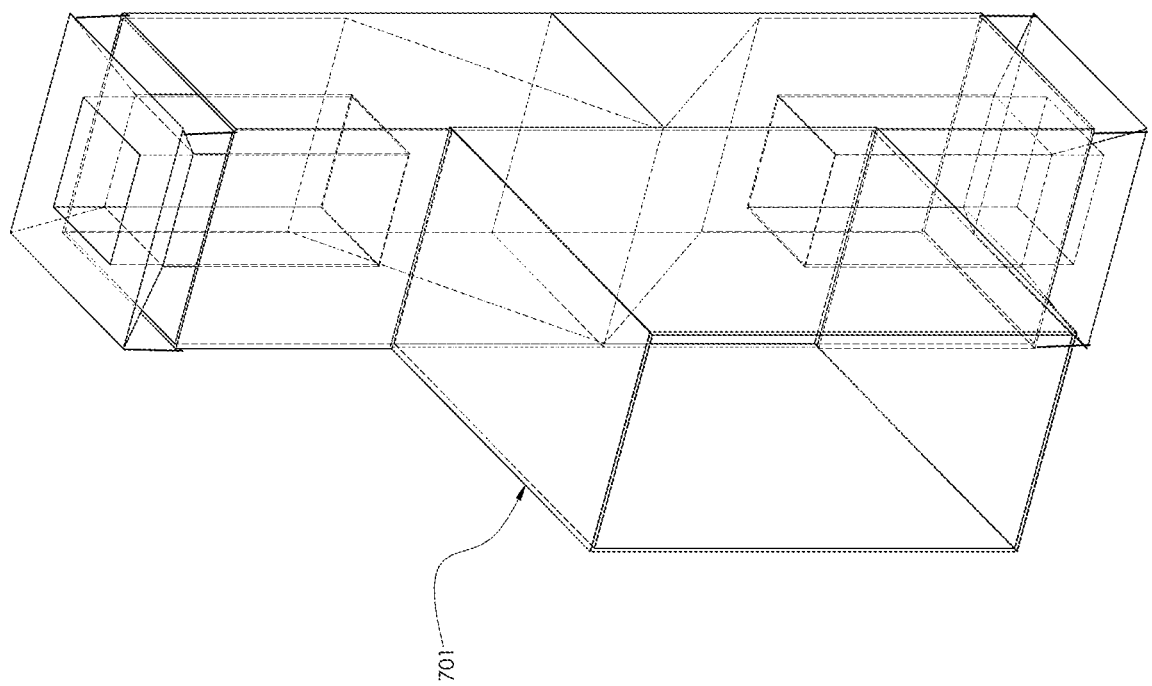
FIG. 7 is an illustration of an embodiment of the omnidirectional image and video capturing system in FIG. 5 with an added apparatus.

FIGS. 1-4 show embodiments capable of capturing a limited omnidirectional field of view. FIGS. 1-4 show embodiments featuring five (5) reflectors. The embodiments shown in FIGS. 1-4 are not able to capture a small sector of visibility, also known as a blind spot, directly below the omnidirectional image and video capturing system (capturing system). FIGS. 5-7 show an embodiment capable of full omnidirectional visibility, as it is able to capture both above and below a particular reference point.

Figure 2:
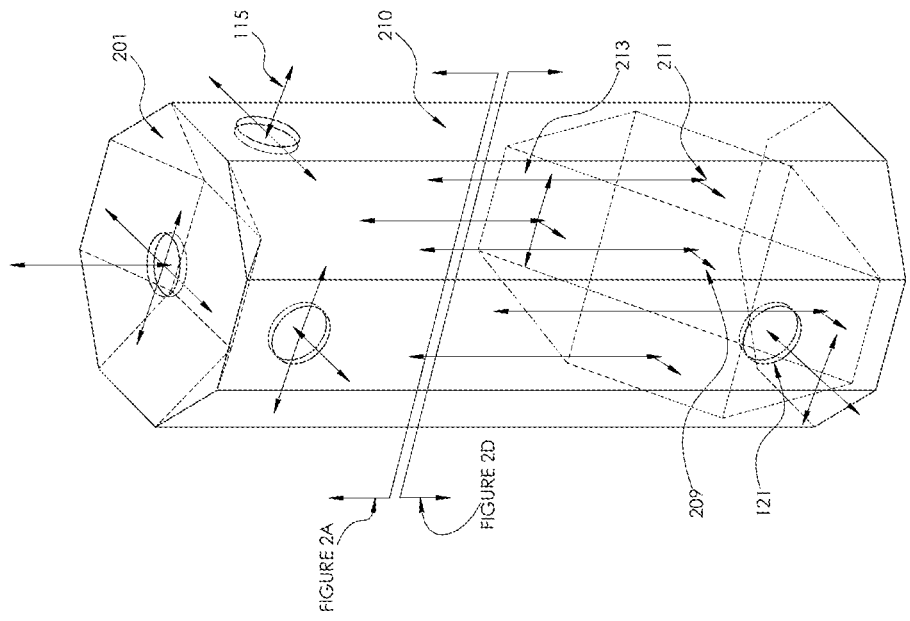
FIG. 2 is an illustration of the interior of the omnidirectional image and video capturing system in FIG. 1.
Figure 1:
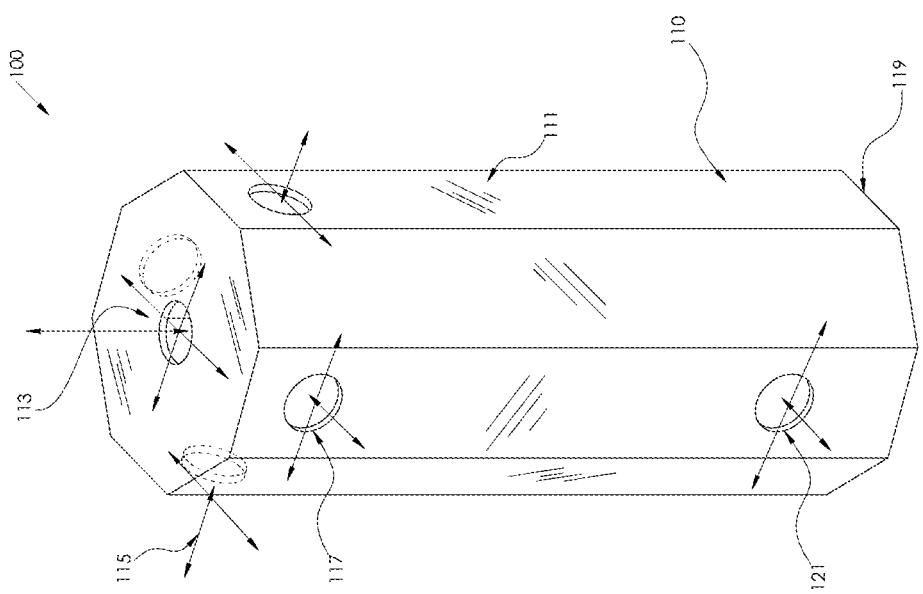
FIG. 1 is an illustration of an omnidirectional image and video capturing system.
Figure 2D:
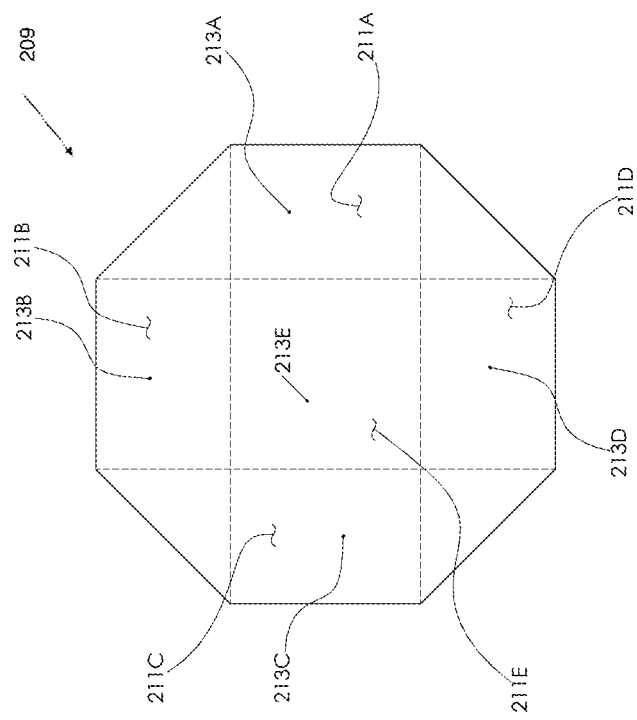
Figure 2C:
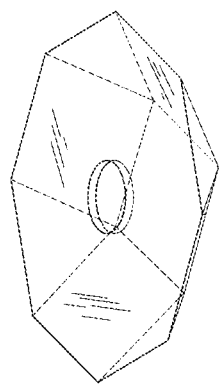

FIGS. 1 and 2 show a diagram of an embodiment of the capturing system 100. The capturing system 100 is comprised of a generally elongated polygonal shaped tube 110 having an interior surface 210, top surface 113, bottom surface 119, and side perimeter surface 111. The capturing system is shown to have four (4) hole penetrations 117 through it near the top surface 113 of the tube 110, to allow the passage of rays of light 115 from the surrounding area into the capturing system 100. Four (4) primary reflectors 201A-D in the form of mirrors, usually isosceles tetrahedral in shape, are mounted to the interior surface 210 of the tube 110, approximately angled at a 45-degree angle and symmetrical around the central vertical axis of the tube 110, with their reflective surfaces directed towards the hole penetrations 117. The capturing system 100 may have a fifth hole penetration 117 though the middle of the top surface 113 of the tube 110. A secondary reflector 209 in the form of a mirror is fixed in place within the interior surface 210 of the tube 110 at a position between the bottom surface 119 of the tube 110 and the primary reflectors 201A-D with its reflective surface directed generally towards the primary reflectors 201A-D at a 45° degree angle wherein the secondary reflector 209 is arranged so that rays of light 213 reflected from the primary reflectors 201A-D and the fifth hole penetration 117 may be reflected by the secondary reflector 209.

In use, rays of light 115 enter the tube via the hole penetrations 117. The rays of light 115 are reflected upon the primary reflectors 201A-D, which then reflect rays of light 213 downwards to the secondary reflector 209. The rays of light 213 pass down from the fifth hole penetration 117, reflecting upon the secondary reflector 209. The rays of light 213 reflected upon the secondary reflector 209 may then be further reflected 211 to an outlet hole 121. Though FIG. 1 shows only one outlet hole 121, this is merely an example for illustration purposes. The capturing system 100 may have a plurality of outlet holes. The outlet hole may also have a much larger circumference wherein a larger amount of rays of light 211 reflected from the secondary reflector 209 may exit the tube 110. Once reflected through the outlet hole 121, the rays of light 211 may then be captured, distinguished into individual reflections, have three dimensional coordinates identified for each reflection, and then stitched together in a three dimensional space to form an omnidirectional image. This process may be continuously repeated to form an omnidirectional video composed of multiple omnidirectional images captured at different time increments.

In some embodiments the omnidirectional image may then be exported to standard editing software such as Apple Final Cut Pro®, Adobe Systems' Premiere®, Adobe Systems' Photoshop® or a virtual reality headset such as the Oculus Rift® or the HTC Vive®. The exported file can also be viewed in full 360×360 on YouTube®, or Facebook® among other internet-based and non-internet based video players.

FIGS. 2A-D further details the primary reflectors 201A-D and secondary reflector 209 within the capturing system 100. The four (4) primary reflectors 201A-D and the fifth hole penetration 117 reflect rays of light 213 upon the secondary reflector 209. Rays of light 211 are then reflected from the secondary reflector 209. For instance primary reflector 201A, arranged at approximately a 45-degree angle, receives rays of light 115 from a hole penetration 117, and reflects the rays of light 213A downward to the secondary reflector 209. Rays of light 211A then are reflected from the secondary reflector 209. The other primary reflectors may also be arranged in a similar fashion. Primary reflector 201B receives rays of light 115 from a hole penetration 117 and reflects the rays of light 213B downward to the secondary reflector 209. Rays of light 211B then are reflected from the secondary reflector 209. Primary reflector 201C receives rays of light 115 from a hole penetration 117 and reflects the rays of light 213C downward to the secondary reflector 209. Rays of light 211C then are reflected from the secondary reflector 209. Primary Reflector 201D receives rays of light 115 from a hole penetration 117 and reflects the rays of light 213D downward to the secondary reflector 209. Rays of light 211D then are reflected from the secondary reflector 209. The rays of light 213E captured from the fifth hole penetration 117 travel down through the tube 110 and are reflected upon the secondary reflector 209. Rays of light 211E then are reflected from the secondary reflector 209.

In some embodiments, the capturing system 100 may be attached to one or more optical lenses with a variety of mounting options ranging from a simple clip on bracket on up to OEM attachments such as for use with standard lens mounts. The optical lenses may be aligned and inserted into the location of the holes in the tube wherein the optical lens would alter the amount of captured light that enters and exits the capturing system.

Figure 4:
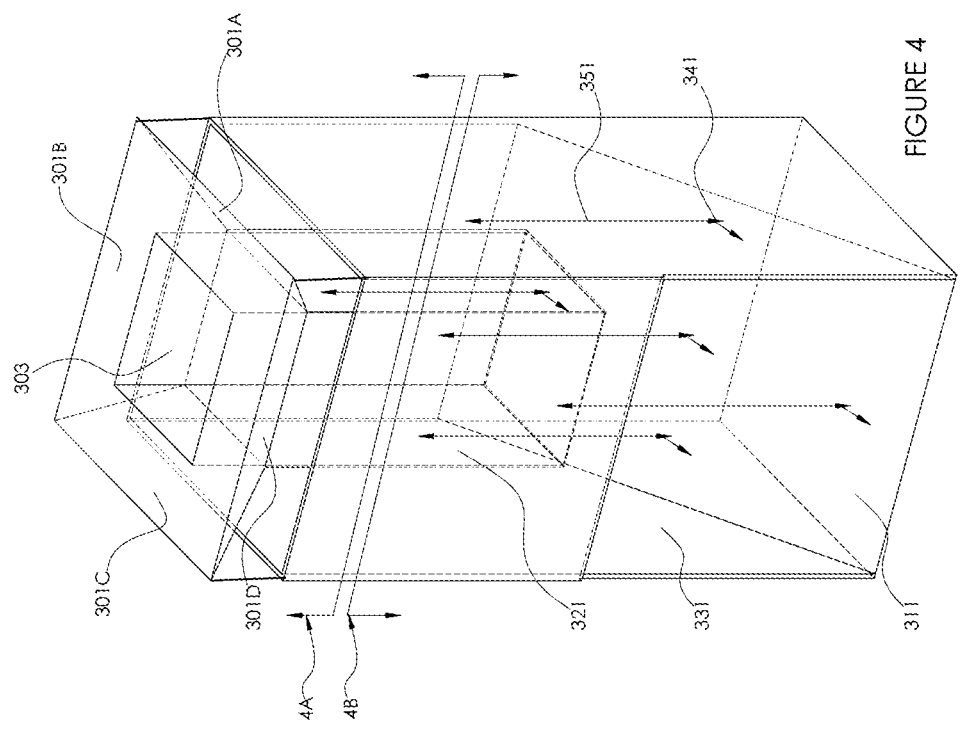
FIG. 4 is an illustration of the interior of the omnidirectional image and video capturing system in FIG. 3.
Figure 3:
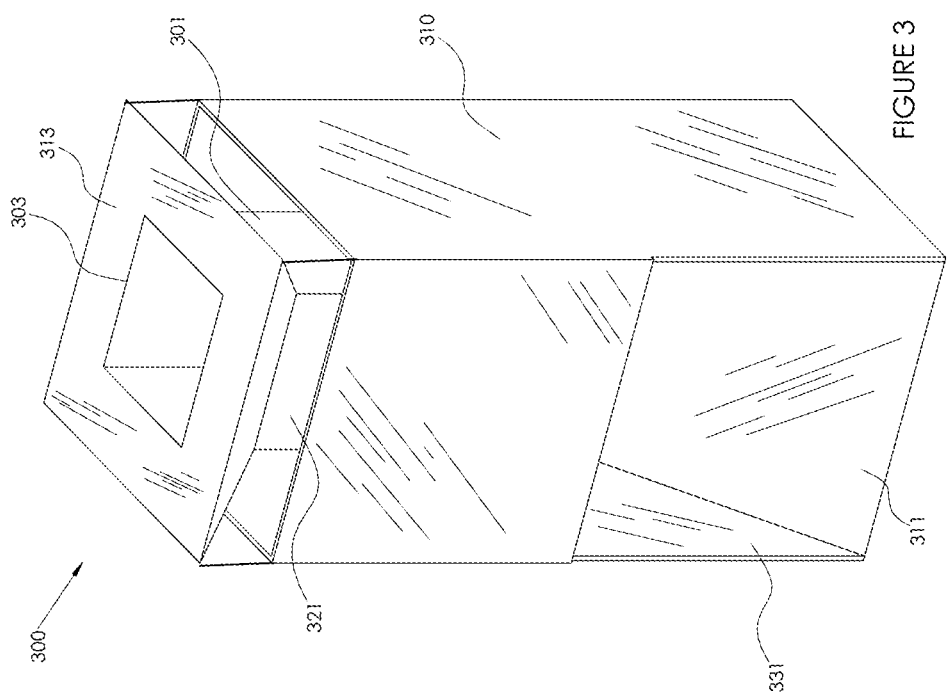
FIG. 3 is an illustration of an alternate embodiment of the omnidirectional image and video capturing system.
Figure 5:
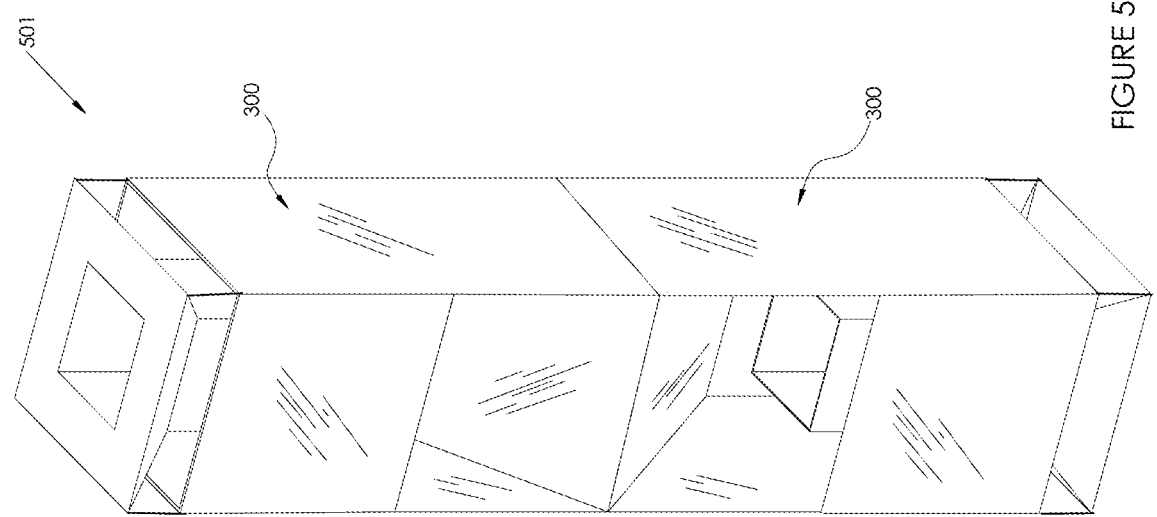
FIG. 5 is an illustration of an alternate embodiment of the omnidirectional image and video capturing system.

FIGS. 3 and 4 show a diagram of an embodiment of the capturing system 300. The capturing system 300 is comprised of a generally polygonal square shape tube 310 having an interior, inner prism 321, top surface 313, bottom surface, and side perimeter surface. The inner prism 321 is of smaller area than the tube 310 and is symmetrical with the tube 310 around the vertical axis. The capturing system 300 is shown to have openings near the top surface of the tube, to allow the passage of lights rays from the surrounding area into the capturing system 300. There are four (4) primary reflectors 301A-D, in the form of mirrors, usually isosceles tetrahedral in shape, mounted to the top surface 313, approximately at a 45-degree angle and symmetrical around the central vertical axis of the inner prism 321. The capturing system 300 may have an opening 303 through the middle of the top surface 313 of the tube 310. A secondary reflector 311 in the form of a mirror, is fixed in place within the interior of the tube 310 at a position between the bottom of the tube and the primary reflectors 301A-D and inner prism 321, with its reflective surface directed generally towards the primary reflectors 301A-D and inner prism preferably at 45° degree angle wherein the secondary reflector 311 is arranged that rays of light 351 reflected from the primary reflectors 301A-D and from the opening 303 on the top surface 313 may be reflected by the secondary reflector 311.

In use, rays of light enter the tube via the openings near the top surface and on the top surface. The rays of light are reflected upon the primary reflectors 301A-D, which then reflect rays of light 351 downwards to the secondary reflector 311. The rays of light 351 pass down from the fifth hole penetration 303, creating an image on the secondary reflector 311. The rays of light 351 reflected upon the secondary reflector 311 may then be further reflected 341 to an open cavity 331. Though FIGS. 3 and 4 shows only one open cavity 331, this is merely an example for illustration purposes. The system may have a plurality of open cavities. The open cavity 331 may also be of larger area wherein rays of light 341 reflected from the secondary reflector 311 may exit through the tube. Once reflected through the open cavity 331, the images may then be captured, distinguished into individual reflections, have three dimensional coordinates identified for each reflection, and then stitched together in a three dimensional space to form an omnidirectional image. This process may be continuously repeated to form an omnidirectional video composed of multiple omnidirectional images captured at different time increments.

In some embodiments, the omnidirectional image may then be exported to standard editing software such as Apple Final Cut Pro®, Adobe Systems' Premiere®, Adobe Systems' Photoshop® or a virtual reality headset such as the Oculus Rift® or the HTC Vive®. The exported file can also be viewed in full 360×360 on YouTube®, or Facebook® among other internet-based and non-internet based video players.

Figure 4B:
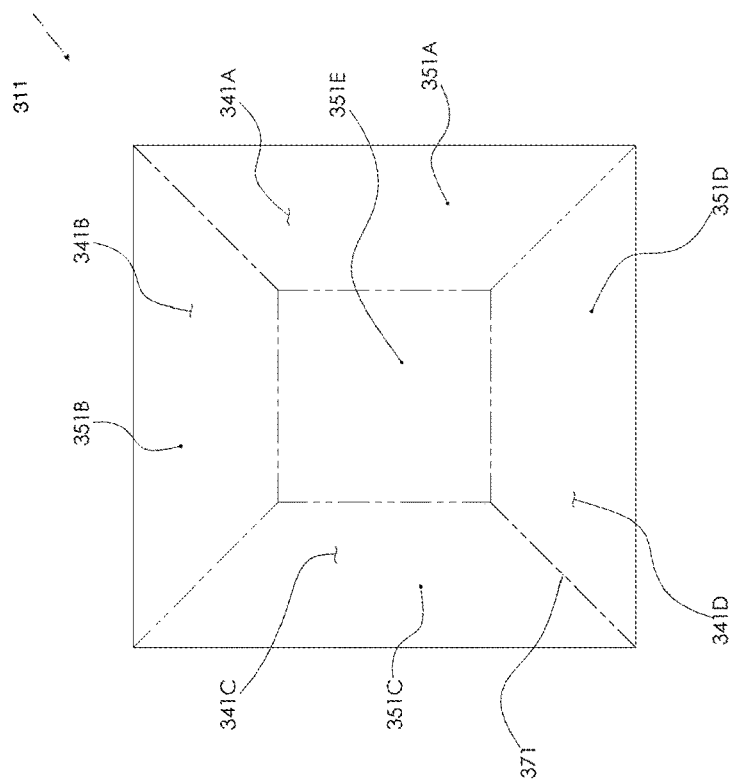
FIG. 4A-B illustrate a top view and bottom view of the omnidirectional image and video capturing system in FIG. 3.
Figure 4A:
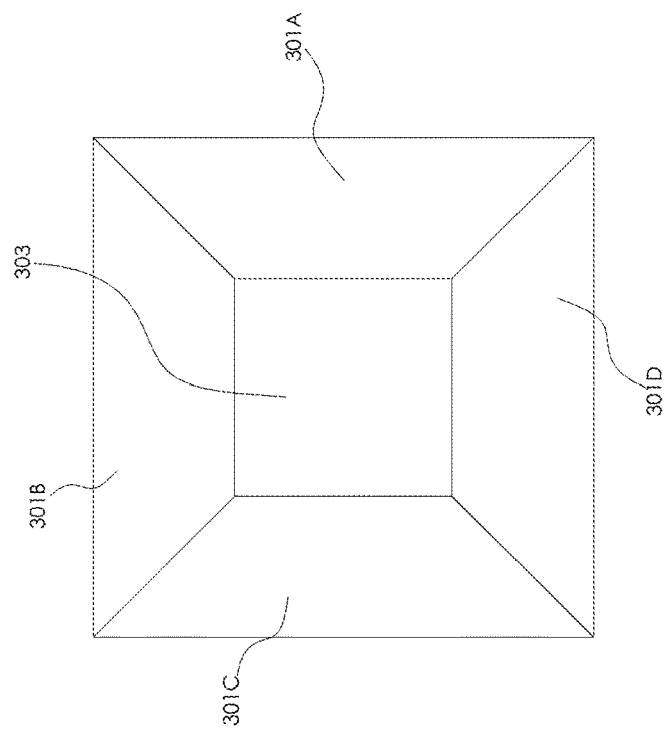

FIGS. 4A-B further details the primary reflectors 301A-D and secondary reflector 311 within the capturing system 300. The four (4) primary reflectors 301A-D and the opening 303 on the top surface 313 reflect rays of light 351 upon the secondary reflector 311. Rays of light 341 are then reflected from the secondary reflector 311. For instance primary reflector 301A, arranged at approximately a 45-degree angle, receives rays of light from the surrounding area, and reflects the rays of light 351A downward to the secondary reflector 311. Rays of light 341A then are reflected from the secondary reflector 311. The other primary reflectors may also be arranged in a similar fashion. Primary reflector 301B receives rays of light from the surrounding area and reflects the rays of light 351B downward to the secondary reflector 311. Rays of light 341B then are reflected from the secondary reflector 311. Primary reflector 301C receives rays of light from the surroundinng area and reflects the rays of light 351C downward to the secondary reflector 311. Rays of light 341C then are reflected from the secondary reflector 311. Primary Reflector 301D receives rays of light from the surrounding area and reflects the rays of light 351D downward to the secondary reflector 311. Rays of light 341D then are reflected from the secondary reflector 311. The rays of light 351E captured from the opening 303 on the top surface 313 travel down through the tube 310 and are reflected upon the secondary reflector 311. Rays of light 341E then are reflected from the secondary reflector 311.

In some embodiments, the capturing system 300 may be attached to one or more optical lenses with a variety of mounting options ranging from a simple clip on bracket on up to OEM attachments such as for use with standard lens mounts. The optical lenses may be aligned and inserted into the location of the openings in the tube wherein the optical lens would alter the amount of captured light that enters and exits the capturing system.

FIGS. 5 and 6 show a diagram of an embodiment of the capturing system 501. The capturing system 501 is comprised of two polygonal square shape tubes 300 arranged in a single configuration. The lower tube is of the same embodiment as FIGS. 3 and 4. The upper tube however is placed on top of the second base tube in an opposed configuration. As shown, the bottom surface of the first base corresponds to the top of the second upper tube. The first and second tubes 300 reflect rays of light by one or more top primary reflectors, the rays of light are then reflected along a linear path onto a secondary reflector 305, wherein the rays of light are then diverted out through a first open cavity 601 on the upper tube and second open cavity 603 on the lower tube. This provides two conglomerations from each the first tube and the second tube to provide a full 360×360 visibility.

FIG. 7 shows a diagram of an embodiment of the capturing system. The embodiment is of the same embodiment as FIGS. 5 and 6, however, an apparatus 701 is connected to the capturing system, wherein the apparatus may capture, converge, alter, or further reflect rays of light reflected from the upper and lower tube.

Once reflected through the first open cavity 601 and second open cavity 603, the rays of light may then be captured, distinguished into individual reflections, have three-dimensional coordinates identified for each reflection, and then stitched together in a three-dimensional space to form a true completely omnidirectional image. This process may be continuously repeated to form an omnidirectional video composed of multiple omnidirectional images captured at different time increments.

In some embodiments, the omnidirectional image may then be exported to standard editing software such as Apple Final Cut Pro®, Adobe Systems' Premiere®, Adobe Systems' Photoshop® or a virtual reality headset such as the Oculus Rift® or the HTC Vive®. The exported file can also be viewed in full 360×360 on YouTube®, or Facebook® among other internet-based and non-internet-based video players.

In some embodiments, the capturing system 500 may be attached to one or more optical lenses with a variety of mounting options ranging from a simple clip on bracket on up to OEM attachments such as for use with standard lens mounts. The optical lenses may be aligned and inserted into the location of the openings in the tube wherein the optical lens would alter the amount of captured light that enters and exits the capturing system.

Figure 8:
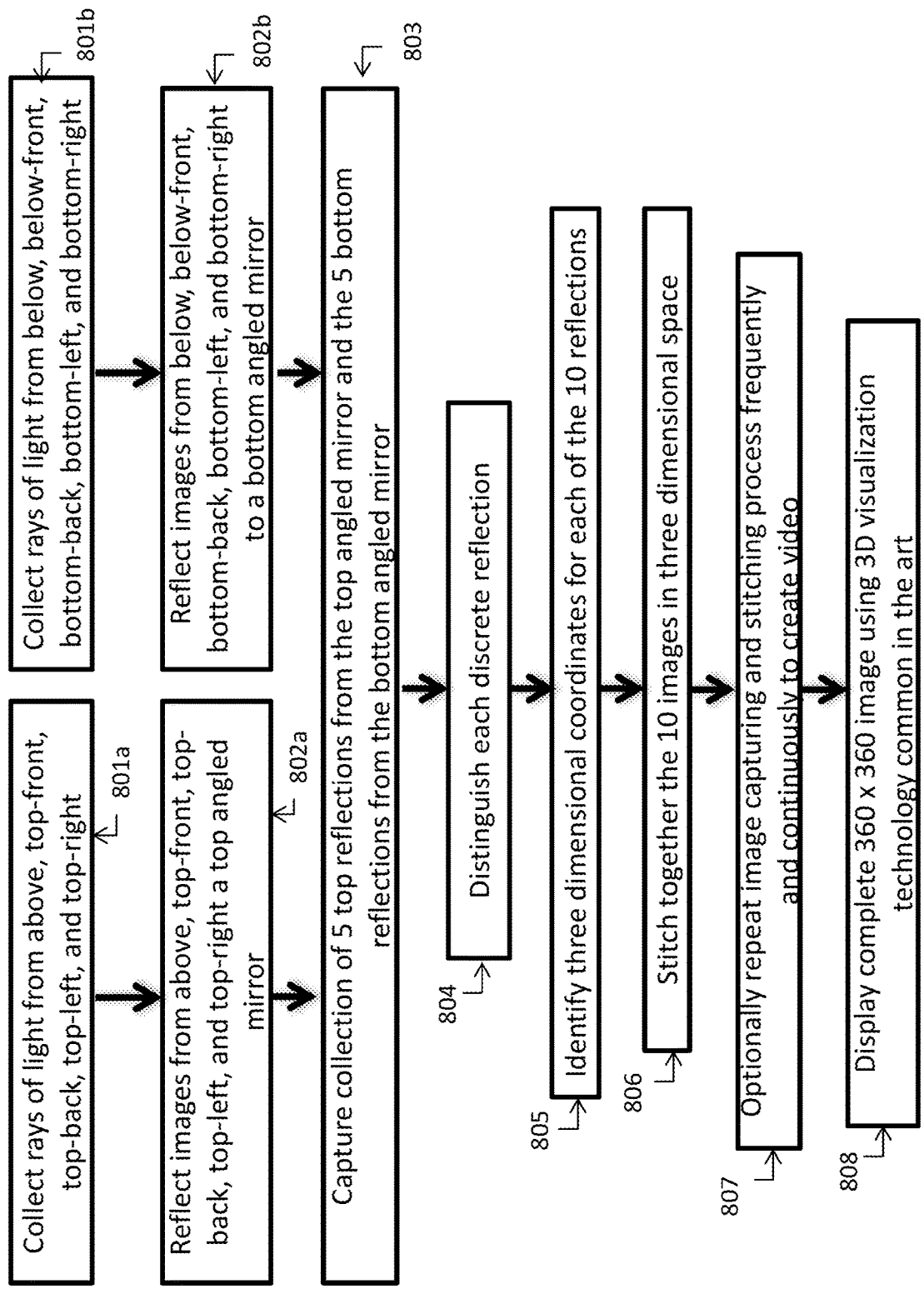
FIG. 8 is a flow chart of an omnidirectional image and video capturing method according to the present embodiment.

FIG. 8 further details the method of use for this embodiment. The upper component of the capturing system collects rays of light from above, top-front, top-back, top-left, and top-right 801a while simultaneously the bottom component of the capturing system collects rays of light from below, below-front, bottom-back, bottom-left, and bottom-right 801b. The upper component then reflects images from above, top-front, top-back, top-left, and top-right a top angled secondary reflector 802a while the bottom component simultaneously reflects images from below, below-front, bottom-back, bottom-left, and bottom-right to a bottom angled secondary reflector 802b. The capturing system then captures the collection of five (5) top reflections from the top angled secondary reflector and the five (5) bottom reflections from the bottom angled secondary reflector 803. The capturing system then distinguishes each discrete reflection 804. The capturing system then identifies three-dimensional coordinates for each of the ten (10) reflections 805. The capturing system then stitches together the ten (10) images in three-dimensional space 806. The system may optionally repeat image capturing and stitching process frequently and continuously to create video 807. The system then displays a complete 360×360 image using 3D visualization technology common in the art 808.

In an alternate embodiment, the capturing system may have eleven (11) hole penetrations. Eight (8) hole penetrations are arranged along the walls of the device where the upper and lower tubes meet, one may be mounted in the horizontal interior wall separating the two base tubes, one may be mounted along the exterior wall at the devices pinnacle and one may be mounted along the exterior wall at the devices base. Preferably four (4) of the eight (8) hole penetrations are arranged along the walls of the device are above where the two base tubes meet and four (4) are below. In each case, the hole penetrations are preferably mounted on opposing sides. The hole penetration in the horizontal interior wall is preferably located in the center of the horizontal interior wall below the internal secondary reflectors. The hole penetration mounted along the exterior wall is preferably in the middle of the exterior wall. Another two (2) hole penetrations are arranged at the top and bottom of the device and another hole penetration positioned in the middle between the two tube meet.

While the present invention has been related in terms of the foregoing embodiments those skilled in the art will recognize that the invention is not limited to the embodiments described. The present invention may be practiced with modification and alteration within the spirit and scope of the appended claims. Thus, the description is to be regarded as illustrative instead of restrictive on the present invention.

The invention claimed is:

1. A video and image capturing system comprising:
   a tube with a top surface, an exterior surface, and an interior surface;
   four primary reflectors, wherein the four primary reflectors reflect images collected from rays of light from a plurality of open cavities through the tube;
   a first open cavity positioned through the top surface of the tube;
   at least one secondary reflector, the secondary reflector a mirror, the secondary reflector positioned between the primary reflectors and a bottom surface of the tube to reflect an image reflected from the primary reflectors on the interior surface of the tube and to receive rays of light from the open cavity positioned through the top surface; and
   a second open cavity positioned through the tube to receive the reflected image from the secondary reflector wherein the reflected image at the second open cavity is configured to be captured, wherein the four primary reflectors positioned on the interior surface of the tube are aligned at an acute angle from the central axis of the tube, directed towards four openings, the four primary reflectors and the respective four openings symmetrical around the central axis, wherein the secondary reflector is directed towards the primary reflectors at an acute angle.

2. The video and image capturing system of claim 1; wherein the primary reflectors on the interior surface of the tube are isohedral in shape.

3. The video and image capturing system of claim 2; wherein the plurality of open cavities through the tube are a plurality of holes through the tube wherein rays of light enter through the plurality of holes and reflect off the primary reflectors on the interior surface of the tube.

4. The video and image capturing system of claim 3; wherein the tube is of polygonal square shape.

5. The video and image capturing system of claim 4; wherein at least one optical lens is mounted coaxially within the tube, arranged substantially at a right-angle to the tube.

6. The video and image capturing system of claim 5; wherein the system combines images from all viewing angles into one image, wherein the image is configured to be decoded utilizing one of stitching, displaying, or decoding non-transitory storage media.

7. A video and image capturing system comprising:
   a first and second tube each with a top surface, bottom surface, an exterior surface, and an interior surface;
   the first tube and the second tube each having four-primary reflectors positioned on the interior surface of the first tube and the second tube wherein the four primary reflectors reflect images collected from rays of light from a plurality of open cavities through the first and second tubes;
   the first tube and the second tube each having a first open cavity positioned through the top surface of the first and second tubes along a central axis of the first tube and the second tube;
   the first tube and the second tube each having at least one secondary reflector positioned within the interior of the first and second tubes to reflect an image reflected from the primary reflectors on the interior surface of the first and second tubes and to receive rays of light from the open cavity positioned through the top surface of the first and second tubes;
   the first tube and the second tube each having a second open cavity positioned through each of the first and second tubes to receive the reflected image from the secondary reflector.

8. The video and image capturing system of claim 7; wherein the second tube is mounted to the first tube in an opposed configuration such that the tubes are coaxial, wherein the bottom surface of the first tube shares a surface with the bottom surface of the second tube.

9. The video and image capturing system of claim 8; wherein an apparatus is mounted to the system wherein the apparatus receives images from the secondary reflector in the first and second tube.

10. The video and image capturing system of claim 9; wherein at least one lens is mounted coaxially within the first tube and the second tube.

11. The video and image capturing system of claim 10; wherein the primary reflectors positioned on the interior surface of the first and second tube are aligned at an acute angle away from the central axis of the first tube and the second tube, directed towards at least one opening, the four primary reflectors and respective four openings symmetrical around the central axis of the first tube and the second tube, the secondary reflector directed towards the primary reflectors at an acute angle.

12. The video and image capturing system of claim 11; wherein the plurality of open cavities through the first tube and the second tube is a plurality of holes through the first tube and the second tube wherein rays of light may enter through the plurality of holes and reflect off the primary reflectors on the interior surface of the first tube and the second tube.

13. The video and image capturing system of claim 12; wherein the system combines images from all viewing angles into one manually decoded image, wherein the image may be decoded utilizing one of stitching, displaying, or decoding non-transitory storage media.

* * * * *